US008997946B2

(12) United States Patent
Haydon et al.

(10) Patent No.: US 8,997,946 B2
(45) Date of Patent: Apr. 7, 2015

(54) ELECTRIC BRAKE ACTUATOR MODULE FOR AIRCRAFT

(75) Inventors: Thomas H. Haydon, Troy, OH (US); Michael J. Ortman, Springfield, NJ (US); Steve Anderson, Upper Saddle River, NJ (US); Eric Schwaigert, South Burlington, VT (US)

(73) Assignee: Goodrich Corporation, Charlotte, NC (US)

( * ) Notice: Subject to any disclaimer, the term of this patent is extended or adjusted under 35 U.S.C. 154(b) by 703 days.

(21) Appl. No.: 11/304,220

(22) Filed: Dec. 15, 2005

(65) Prior Publication Data

US 2006/0102436 A1 May 18, 2006

Related U.S. Application Data

(63) Continuation of application No. 10/878,290, filed on Jun. 28, 2004, now abandoned, which is a continuation of application No. 09/660,063, filed on Sep. 12, 2000, now abandoned.

(60) Provisional application No. 60/153,731, filed on Sep. 13, 1999.

(51) Int. Cl.
  *F16D 55/08* (2006.01)
  *F16D 55/36* (2006.01)
  (Continued)

(52) U.S. Cl.
  CPC .............. *F16D 55/36* (2013.01); *F16D 65/14* (2013.01); *F16D 65/186* (2013.01); *F16D 65/18* (2013.01);
  (Continued)

(58) Field of Classification Search
  CPC . F16D 55/00; F16D 2055/0004; F16D 55/08; F16D 55/14; F16D 55/16; F16D 55/38; F16D 65/092; F16D 65/14; F16D 65/18; F16D 65/186
  USPC .................... 188/18 A, 71.5, 72.5, 72.7, 72.8
  See application file for complete search history.

(56) References Cited

U.S. PATENT DOCUMENTS 2,671,484 A * 3/1954 Clark ............................... 81/451
2,985,259 A * 5/1961 Gardner ....................... 188/71.5
(Continued)

FOREIGN PATENT DOCUMENTS

EP   0 936 373 A   8/1999
EP   1214531      12/2005
(Continued)

OTHER PUBLICATIONS

Opposition to European Patent No. 1214531 B1 with D5, Sep. 27, 2006.

*Primary Examiner* — Melody Burch
(74) *Attorney, Agent, or Firm* — Snell & Wilmer, L.L.P.

(57) ABSTRACT

An electro-mechanical brake assembly comprising a brake disk stack having a center axis; and a plurality electro-mechanical actuators for applying braking pressure to the brake disk stack. The actuators are circumferentially arranged around the center axis, and each actuator includes a housing, a linearly movable ram, a screw for linearly moving the ram, a nut mounted for rotation in the housing and operatively engaged with the screw such that rotation of the nut effects linear movement of the screw for urging the ram into forceful engagement with the brake disk stack, an electric motor for rotating the nut, and an anti-rotation device for preventing rotation of the screw relative to the housing when the nut is rotated to effect linear movement of the screw. The foregoing arrangement provides for greater stroke than prior art actuators without sacrificing durability and performance.

14 Claims, 4 Drawing Sheets

(51) Int. Cl.
  *F16D 65/14* (2006.01)
  *F16D 65/00* (2006.01)
  *F16D 65/18* (2006.01)
  *F16D 55/00* (2006.01)
  *F16D 66/00* (2006.01)
  *F16D 121/24* (2012.01)
  *F16D 125/40* (2012.01)
  *F16D 125/48* (2012.01)
  *F16D 125/52* (2012.01)

(52) U.S. Cl.
  CPC . *F16D 2055/0058* (2013.01); *F16D 2055/0091* (2013.01); *F16D 2066/003* (2013.01); *F16D 2066/005* (2013.01); *F16D 2121/24* (2013.01); *F16D 2125/40* (2013.01); *F16D 2125/48* (2013.01); *F16D 2125/52* (2013.01)

(56) References Cited

U.S. PATENT DOCUMENTS

| | | | |
|---|---|---|---|
| 3,958,670 A | 5/1976 | Anderson | 188/196 R |
| 4,374,551 A | 2/1983 | Birkenbach et al. | |
| 4,381,049 A | 4/1983 | Crossman | |
| 4,432,440 A | 2/1984 | Crossman | |
| 4,491,203 A * | 1/1985 | Monick | 188/71.9 |
| 4,542,809 A | 9/1985 | Crossman | |
| 4,567,967 A | 2/1986 | Crossman | |
| 4,596,316 A | 6/1986 | Crossman | |
| 4,712,441 A | 12/1987 | Abraham | |
| 4,721,190 A | 1/1988 | Schmidt et al. | |
| 4,809,824 A | 3/1989 | Fargier et al. | |
| 4,865,162 A * | 9/1989 | Morris et al. | 188/72.8 |
| 4,907,660 A * | 3/1990 | Staggs et al. | 175/320 |
| 4,995,483 A | 2/1991 | Moseley et al. | |
| 5,086,861 A | 2/1992 | Peterson | |
| 5,107,967 A | 4/1992 | Fujita et al. | 188/72.1 |
| 5,348,123 A | 9/1994 | Takahashi et al. | |
| 5,676,504 A * | 10/1997 | Mueller et al. | 409/83 |
| 6,095,293 A * | 8/2000 | Brundrett et al. | 188/72.1 |
| 6,112,864 A | 9/2000 | Suzuki et al. | |
| 6,139,460 A | 10/2000 | Drennen et al. | |
| 6,286,634 B2 | 9/2001 | Niespodziany et al. | |
| 6,471,015 B1 * | 10/2002 | Ralea et al. | 188/1.11 L |

FOREIGN PATENT DOCUMENTS

| | | |
|---|---|---|
| GB | 2031540 | 4/1980 |
| JP | 6453710 | 3/1989 |
| WO | WO-9850711 A1 * | 11/1998 |
| WO | 99 21266 A | 4/1999 |

* cited by examiner

ELECTRIC BRAKE ACTUATOR MODULE FOR AIRCRAFT

RELATED APPLICATION DATA

This application is a continuation of U.S. patent application Ser. No. 10/878,290 filed on Jun. 28, 2004 now abandoned, which is a continuation of U.S. patent application Ser. No. 09/660,063 filed on Sep. 12, 2000 now abandoned, which claims benefit of U.S. Provisional Application No. 60/153,731 filed Sep. 13, 1999, all of which are hereby incorporated herein by reference in their entirety.

FIELD OF THE INVENTION

The invention herein described relates generally to an electric brake actuator module particularly useful in aircraft.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

Electrically actuated aircraft brakes of various configurations are known, as exemplified by U.S. Pat. Nos. 4,381,049, 4,432,440, 4,542,809 and 4,567,967. The brake assemblies shown in these patents include electric motors which respond to an electrical control signal to effect rotation of a ring gear member which interacts through a plurality of balls to drive a linearly movable ram member into contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with the brake pressure plate to effect compression of the brake disk stack for braking action. A plurality of electric motors and their associated pinions drive a ring gear into rotation and the plurality of roller screws effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are mounted in a balanced arrangement about the axis of the wheel to apply and release a brake pressure force on the brake disk stack in response to an electrical control signal to the torque motors.

In U.S. Pat. No. 4,995,483, there is described a motor position feedback control system for an electrically actuated aircraft brake. The system controller provides brake clamping and declamping in response to a position feedback controlled brake actuator in which an electric torque motor drives a rotating member of a reciprocating drive mechanism to axially move another member into and out of engagement with a brake pressure plate of a multi-disk brake assembly. The position feedback is obtained using a rotor position resolver which provides relative position information to the controller. Such a system requires a re-calibration of the position sensor after a power interruption which may result in loss of braking capability, long recovery time and possible uncommanded brake clamp force application.

Among other things, it would be desirable to have an electrically actuated aircraft brake actuator module that has a greater stroke than prior art actuators, thereby to provide longer use between brake disk replacement.

SUMMARY OF THE INVENTION

The present invention provides an electro-mechanical brake assembly comprising a brake disk stack having a center axis; and a plurality electro-mechanical actuators for applying braking pressure to the brake disk stack. The actuators are circumferentially arranged around the center axis, and each actuator includes a housing, a linearly movable ram, a screw for linearly moving the ram, a nut mounted for rotation in the housing and operatively engaged with the screw such that rotation of the nut effects linear movement of the screw for urging the ram into forceful engagement with the brake disk stack, an electric motor for rotating the nut, and an anti-rotation device for preventing rotation of the screw relative to the housing when the nut is rotated to effect linear movement of the screw. The foregoing arrangement provides for greater stroke than prior art actuators without sacrificing durability and performance.

According to one embodiment of the invention, the screw has a bore opening to an end thereof opposite the ram, and the anti-rotation device includes an anti-rotation guide extending into the bore opening in the screw for rotationally interfering with one another to restrain rotation of screw relative to the housing. Preferably, the anti-rotation guide further functions to support the screw against lateral movement. To this latter end, anti-rotation guide extends to a point overlapping the internally threaded portion of the nut that is operatively engaged with the screw.

A preferred nut and screw are a ball-screw device. Also, it is preferably that the electric motor be mounted to and carried by the housing. Ideally, each actuator is a self-contained unit mounted to a wheel mount of a wheel and brake assembly for removal independently of one another and the brake disk stack.

According to another embodiment of the invention, the anti-rotation device includes a bellows connected between the screw and the housing and fixed against rotation relative to the housing, the bellows functioning to restrain rotation of screw relative to the housing. The bellows preferably is sealed with respect to the housing and screw to prevent foreign material from entering the housing at the screw.

Further in accordance with the invention, a position sensor supplies a position signal representative of the position of the ram. The position sensor is fully enclosed within the housing and is connected directly to the screw or ram, or indirectly to a threaded portion on the nut.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Because the invention was conceived and developed for use in an aircraft braking system, it will be herein described chiefly in this context. However, the principles of the invention in their broader aspects can be adapted to other types of braking systems, such as in train brake systems.

Figure 1:
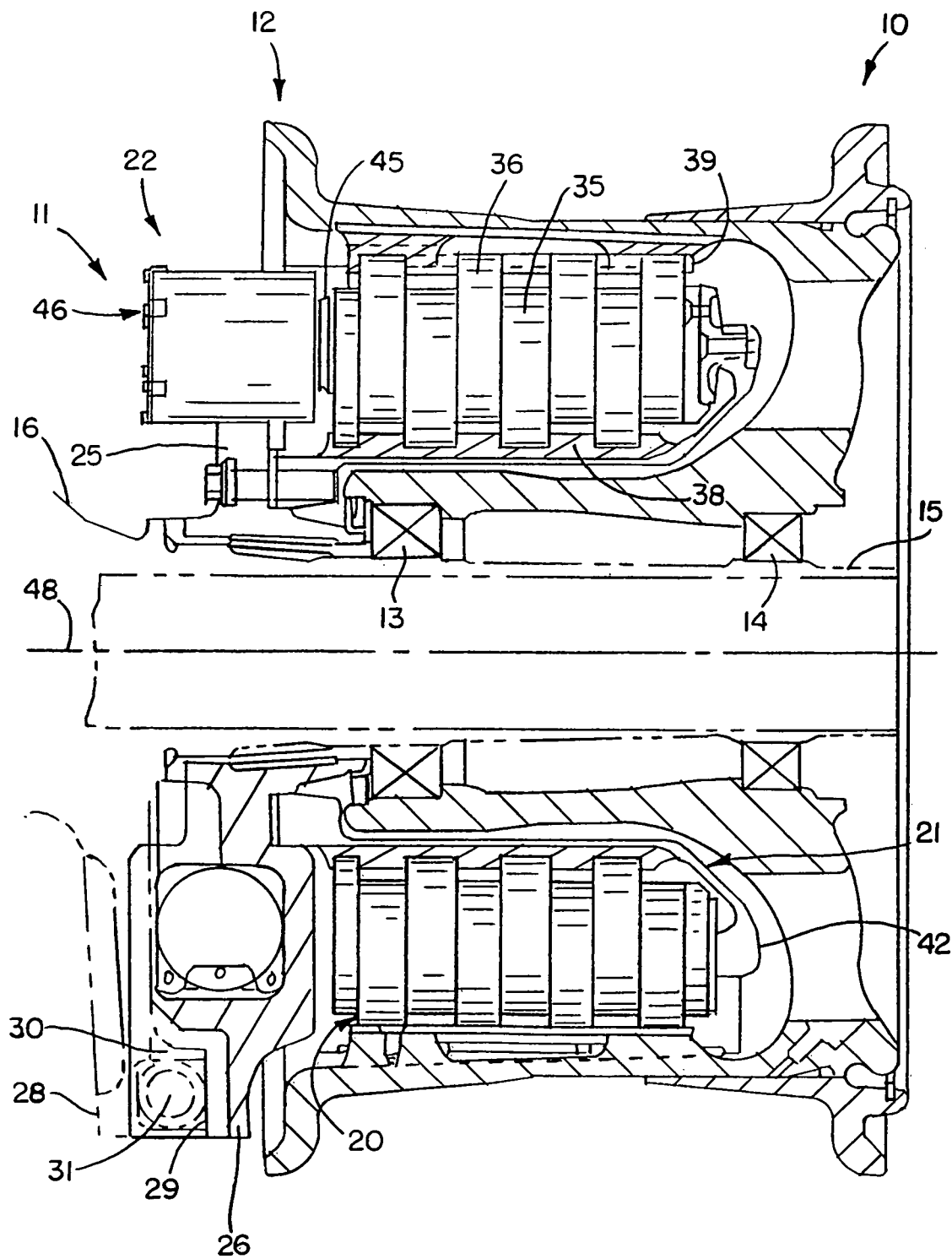
FIG. 1 is cross-sectional view of an aircraft wheel and brake assembly

Referring now in detail to the drawings and initially to FIG. 1, a wheel and brake assembly according to the present invention is generally indicated at 10. The assembly 10 generally comprises a brake 11 and an aircraft wheel 12 which is supported for rotation by bearings 13 and 14 on an axle 15. The axle 15 forms a wheel mount and is attached to the end of an aircraft landing gear strut 16 or a truck attached to the end of a landing gear strut. The brake 11 includes a brake disk stack 20, torque tube 21 and an actuator assembly 22.

The actuator assembly 22 includes a brake head 25 having an integral torque take-out arm 26. The torque take-out arm 26 extends radially and functions as an interface between the brake actuator assembly and the landing gear axle structure (the strut 16 in the illustrated embodiment). The torque take-out arm 26 and a torque reaction arm 28 on the strut 16 have interengaging devices which provide for transfer of torque from the torque take-out arm to the torque reaction arm when braking force is being applied to the disk brake stack 20 by the brake actuator assembly 22. In the illustrated embodiment, the take-out arm 26 has on the inboard side thereof an axially opening recess (socket) 29 for receiving a torque reaction lug 30 on the torque reaction arm 28 and a load transducer 31. The output of the load transducer (load cell) may be supplied to a brake controller for use in controlling the braking operation.

The brake disk stack 20 includes stationary brake elements and rotary brake elements that are interleaved and surround the torque tube. The stationary and rotary brake elements are in the form of stator disks 35 and rotor disks 36. The stator disks 35 are splined to the torque tube 21 and the rotor disks 36 are splined to the wheel 12 interiorly of the wheel's rim. As is conventional, the splined connection may be effected by a plurality of spline or drive keys 38 and 39 that are spaced around the circumference of the rim/torque tube to permit axial movement of the rotor/stator disks while being held to the wheel/torque tube against relative rotation.

The disk stack 20 is located between a back pressure member 42 and the brake head 25. The back pressure member 42 is formed by a radial flange at the outer end of the torque tube 21 that engages the last brake disk at the outboard end of the disk stack.

Pressure is applied to the inboard end of the disk stack 20 by one or more actuator rams 45. The actuator rams 45 are included in respective actuator modules 46 mounted to the brake head 25 by suitable means that may enable quick and easy attachment and detachment of the actuator modules to and from the brake head. The actuator modules preferably are mounted in a circular arrangement around the rotational axis 48 of the wheel, preferably with the actuator rams 45 circumferentially equally spaced apart.

Figure 2:
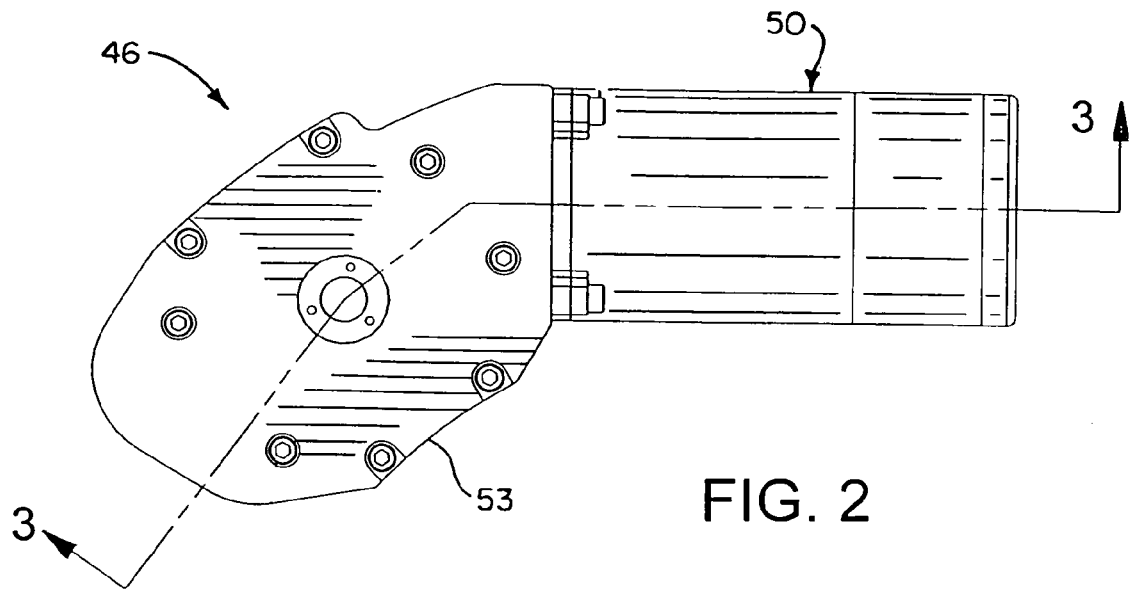
FIG. 2 is a plan view of an exemplary electro-mechanical actuator that has particular application in the aircraft wheel and brake assembly of FIG. 1.
Figure 3:
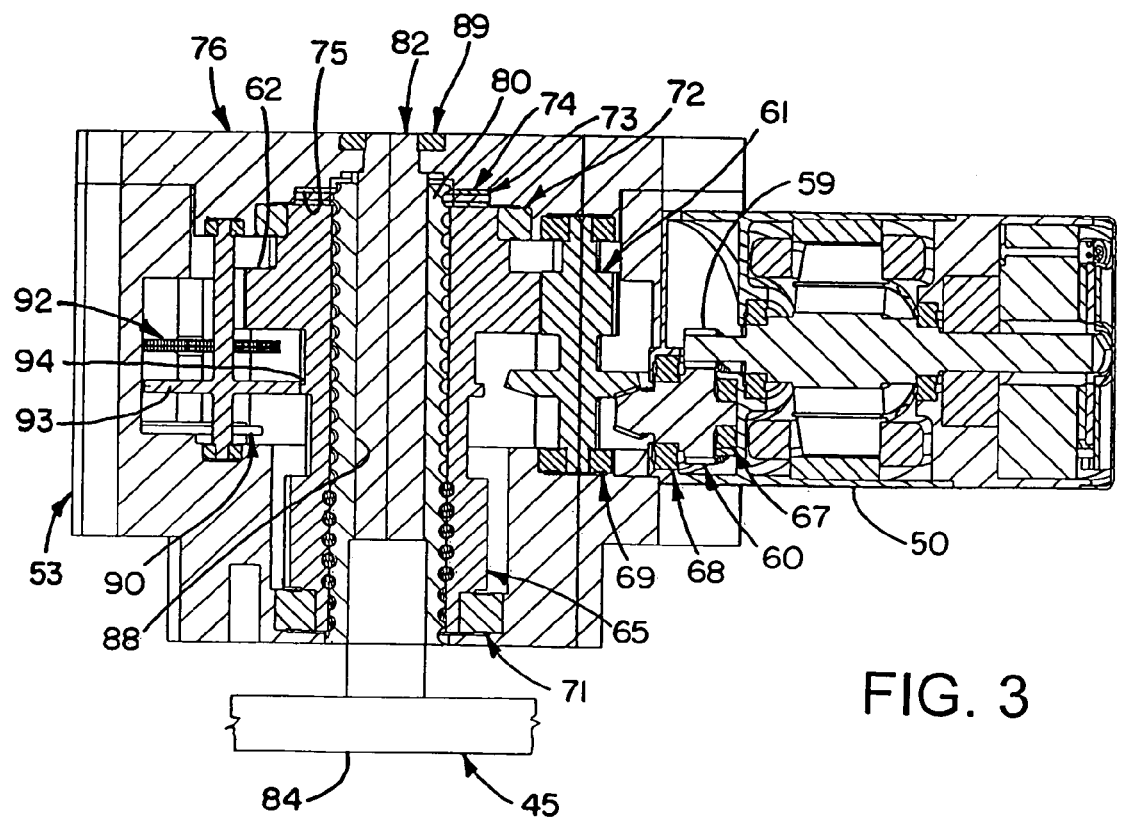
FIG. 3 is a cross-sectional view of the brake actuator of FIG. 1 taken along the line 2-2 of FIG. 2.
Figure 4:
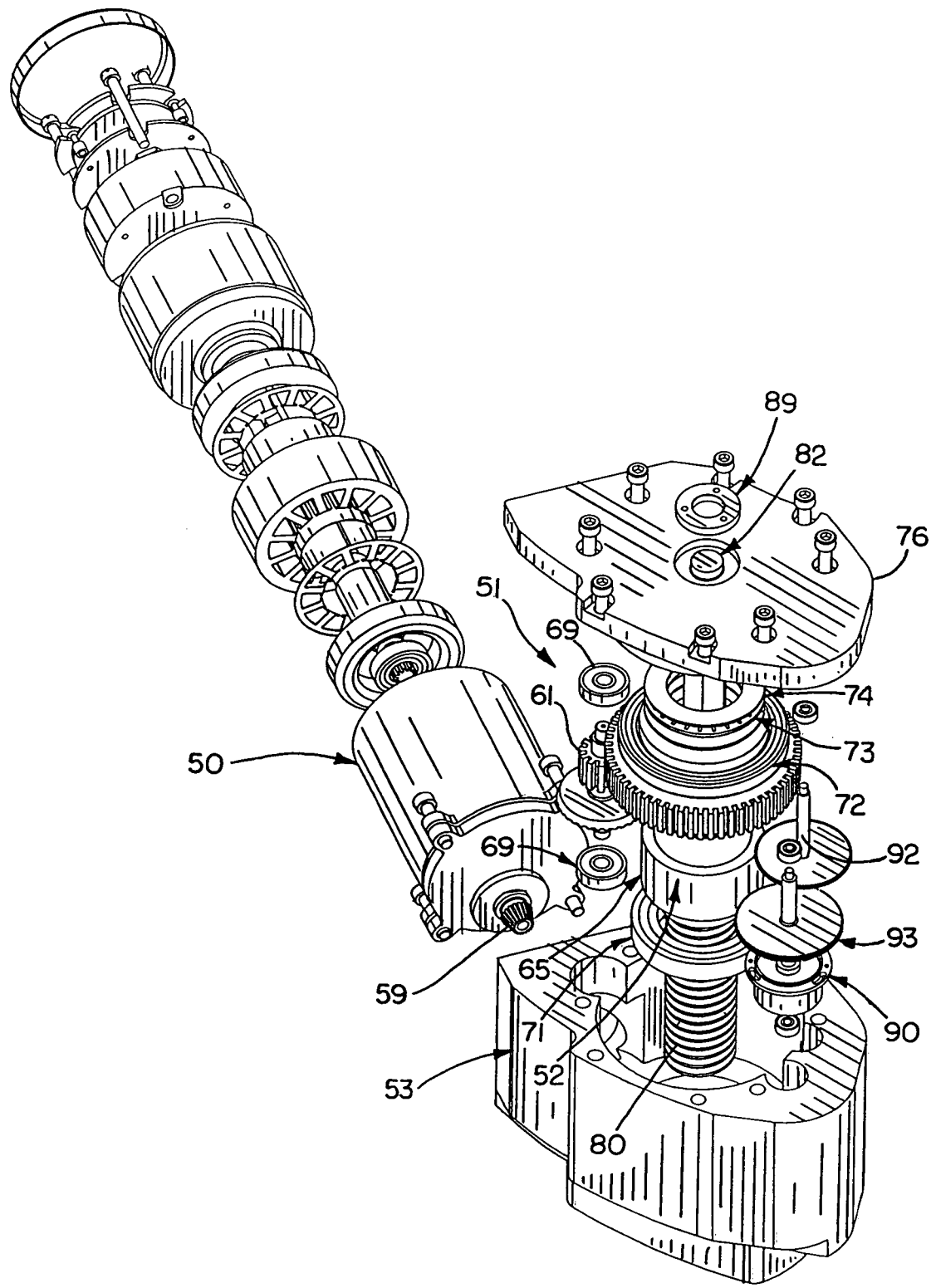
FIG. 4 is an exploded perspective view of the brake actuator of FIG. 1.

Preferably, the modules 46 are identical and interchangeable, and a representative one of the actuator modules is shown in FIG. 2-4. Each actuator module 46 preferably includes an electric motor 50, a gear train 51, and a ball screw assembly 52. The motor 50, gearing 51 and ball screw assembly are all carried in a module housing 53. A mounting flange (not shown) may be provided on the housing for securing the module to the brake head 20.

The gearing 51 includes a pinion 59 on the drive shaft of the electric motor 50, a first-stage transfer gear member 60 in mesh at its input end with the pinion 59, a second stage transfer gear member 61 in mesh at its input end with the output end of the first stage gear member 60, and a ball nut gear 62 in mesh with the output end of the second stage gear 61. The ball nut gear 62 may be formed integrally with the ball nut 65 of the ball screw assembly 52 (although reference herein is made to certain structures as being integral as is preferred, it should be understood such structures alternatively may be composed of discrete components joined together to form a functionally equivalent structure). Suitable bearings are provided for the various rotating components. The first stage transfer gear member 60 is supported by bearings 67 and 68. The second stage transfer gear member 61 is supported by bearings 69. The nut 65 is supported at one end by a rotational bearing 71 and at its other end by a rotational bearing 72 and a thrust bearing 73. A thrust washer 74 may be interposed between the thrust bearing 73 and a housing shoulder 75, such shoulder 75 in the illustrated embodiment being formed on a removable access cover 76.

The ball screw assembly 52 is comprised of the ball nut 65 with the integral gear 62, a ball screw 80 that moves linearly upon rotation of the ball nut, an anti-rotation guide member 82 extending into the hollow interior of the ball screw, and a ram pad 84 that attaches to the end of the ball screw and provides an insulating interface with the brake disk stack (FIG. 2). The ball screw and ball nut have respective spiral grooves/threads and associated balls for converting rotary motion to linear motion. Also, other rotary to linear motion conversion devices may by employed, if desired, with the linear moving member coinciding with the ball screw and functioning at its outboard end as the actuator ram.

In the illustrated ball screw assembly, the interior bore 88 of the screw 80 and the anti-rotation guide 82 have corresponding polygonal cross-sections defined by plural inner/outer side surfaces which rotationally interfere with one another to restrain rotation of the screw relative to the housing 53. As is preferred and illustrated, one or more of the side surfaces, most preferably all of the side surfaces, are planar and form regular polyhedrons providing a close sliding fit between the ball screw and the guide member. It will be appreciated, however, that other configurations may be used although less preferred. The guide member is fixedly mounted to the housing by a nut 89.

Each actuator module 46 preferably includes an output ram resolver or position sensor 90 which provides for actuator rotation and/or position feedback. For example, the ball nut 65 may be mechanically connected to an RVDT position sensor or other absolute position sensor by gears 92 and 93, the latter being in mesh with gear 94 on the nut 65. Other types of position sensors/transducers may be used as desired for a particular application.

Figure 5:
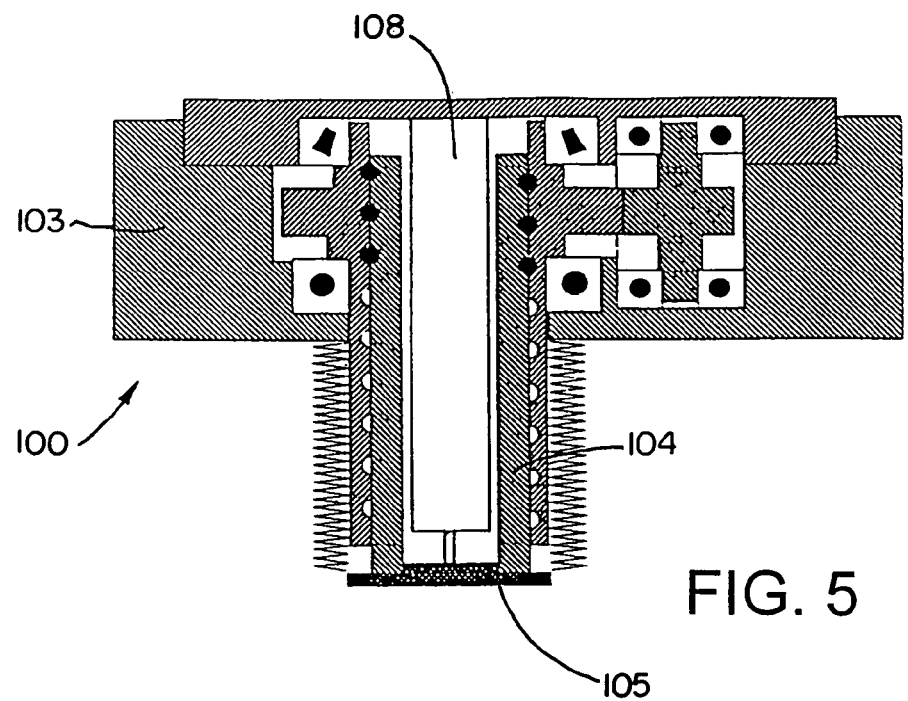
FIG. 5 is a diagrammatic illustration of another embodiment of an electro-mechanical actuator according to the invention.
Figure 6:
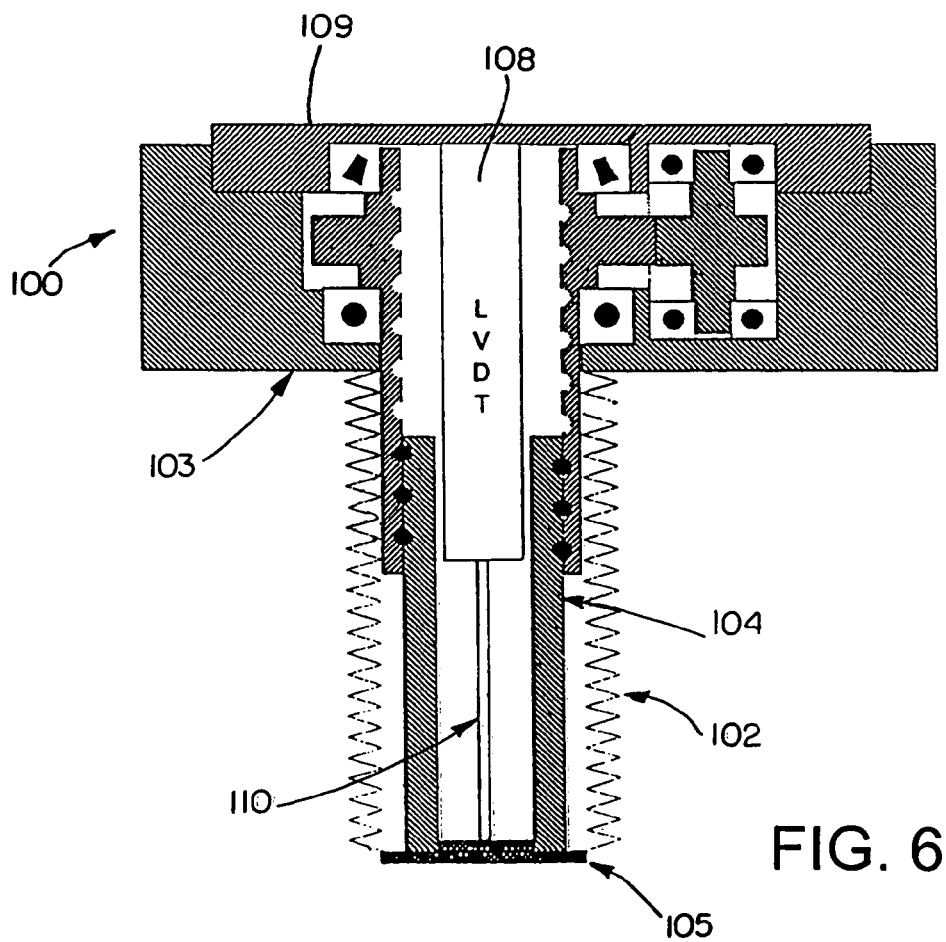
FIG. 6 is an illustration similar to FIG. 5, but showing the ram extended.

Referring now to FIGS. 5 and 6, another embodiment of electro-mechanical brake actuator 100 according to the invention is illustrated, respectively in a retracted and extended position. The brake actuator 100 is essentially as above described, except that in place of the anti-rotation guide, a metal bellows 102 is used as an anti-rotation device. The bellows 102 is connected at one end to the housing 103 and at its other end to the screw 104 directly or via the ram 105. The bellows additionally functions as a seal preventing foreign material from entering the housing at the screw.

The brake actuator 100 also differs in that a position sensor 108 is provided within the interior of the screw. The sensor may by an LVDT or other absolute position sensor with one end connected to the screw by an insulator 110 and the other end connected to the housing, as at an actuator component cover 109 forming part of the overall housing.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. An electro-mechanical brake assembly, comprising:
   a brake head;
   a brake disk stack adjacent the brake head and having a center axis; and
   an electro-mechanical actuator mounted to the brake head for applying braking pressure to the brake disk stack, the actuator being radially offset from the center axis;
   the actuator including:
   a housing removably mounted to the brake head such that the housing can be removed from the brake head without removal of the brake disk stack,
   a linearly movable ram,
   a screw for linearly moving the ram, the screw being retained within the housing such that screw is carried by the housing when the housing is removed from the brake head, and
   a nut mounted for rotation in the housing such that the nut is carried by the housing when the housing is removed from the brake head, the nut being operatively engaged with the screw such that rotation of the nut effects linear movement of the screw for urging the ram into forceful engagement with the brake disk stack,
   an electric motor for rotating the nut, and
   a plurality of the electro-mechanical actuators circumferentially arranged around the center axis,
   wherein an anti-rotation device is provided for preventing rotation of the screw relative to the housing when the nut is rotated to effect linear movement of the screw, wherein the screw has a bore opening to an end thereof opposite the ram, wherein the bore opening is coaxial to the screw and wherein the anti-rotation device includes an anti-rotation guide extending into the bore opening in the screw for rotationally interfering between the anti-rotation guide and the bore opening, to restrain rotation of the screw relative to the housing, wherein the anti-rotation guide is coaxial to the screw,
   wherein the anti-rotation guide further functions to support the screw against lateral movement, and
   wherein the nut has an internally threaded portion, and the anti-rotation guide extends to a point overlapping the internally threaded portion.

2. The electro-mechanical brake assembly as set forth in claim 1, wherein the anti-rotation guide overlaps at least about half the internally threaded portion.

3. The electro-mechanical brake assembly as set forth in claim 1, wherein the nut and screw are a ball-screw device.

4. The electro-mechanical brake assembly as set forth in claim 1, wherein the nut has an integral gear, and the motor is connected by gearing to the integral gear.

5. The electro-mechanical brake assembly as set forth in claim 1, wherein the electric motor is mounted to and carried by the housing.

6. The electro-mechanical brake assembly as set forth in claim 1, further comprising a wheel mount to which the brake disk stack is mounted, and the actuator is a self-contained unit mounted to the wheel mount for removal independently of the brake disk stack.

7. The electro-mechanical brake assembly as set forth in claim 1, comprising a position sensor which supplies a position signal representative of the position of the ram.

8. The electro-mechanical brake assembly as set forth in claim 7, wherein the position sensor is fully enclosed within the housing.

9. The electro-mechanical brake assembly as set forth in claim 7, wherein the screw has a bore opening to an end thereof opposite the ram, and the position sensor is disposed within the interior of the screw.

10. The electro-mechanical brake assembly as set forth in claim 7, wherein the position sensor is connected to the nut.

11. The electro-mechanical brake assembly as set forth in claim 1, wherein the nut and screw are a ball-screw device.

12. The electro-mechanical brake assembly as set forth in claim 1, wherein the electric motor is mounted to and carried by the housing.

13. The electro-mechanical brake assembly as set forth in claim 1, further comprising a wheel mount to which the brake disk stack is mounted, and each actuator is a self-contained unit mounted to the wheel mount for removal independently of one another and the brake disk stack.

14. The electro-mechanical brake assembly as set forth in claim 1, wherein the ram is formed by an outboard end of the screw.

* * * * *